United States Patent [19]
Kennedy

[11] 3,798,876
[45] Mar. 26, 1974

[54] ABATEMENT OF AIR POLLUTION FROM ORGANIC COMPOUNDS WITH POLYMERIC ADSORBENTS

[75] Inventor: David C. Kennedy, Malvern, Pa.

[73] Assignee: Rohm and Haas Company, Philadelphia, Pa.

[22] Filed: Nov. 30, 1971

[21] Appl. No.: 203,444

[52] U.S. Cl. ......................................... 55/59, 55/74
[51] Int. Cl. ............................................ B01d 53/04
[58] Field of Search .................... 55/59, 67, 74, 387

[56] References Cited
UNITED STATES PATENTS

| | | | |
|---|---|---|---|
| 3,686,827 | 8/1972 | Haigh | 55/74 |
| 3,357,158 | 12/1967 | Hollis | 55/67 |
| 3,547,684 | 12/1970 | Hollis et al. | 55/67 |
| 3,564,818 | 2/1971 | Lasky et al. | 55/73 |
| 3,727,379 | 4/1973 | Bitlevell | 55/73 |

*Primary Examiner*—Charles N. Hart

[57] ABSTRACT

This invention relates to an adsorption-based process for the recovery of gaseous and/or vaporized organic chemicals. More particularly, it relates to a method of limiting air pollution caused by atmospheric discharge of odiferous, toxic, or otherwise objectionable chemicals.

20 Claims, No Drawings

3,798,876

ABATEMENT OF AIR POLLUTION FROM ORGANIC COMPOUNDS WITH POLYMERIC ADSORBENTS

BACKGROUND OF THE INVENTION

It is well established that granular activated carbon has practical utility in trapping many volatile organic chemicals which are emitted from varied industrial operations. Operable though it may be, carbon is plagued by:

a. progressive loss of capacity following the first cycle of use which gives a low, final steady-state working capacity;
b. inefficient and incomplete desorption of the adsorbed organic vapors from the carbon bed; and
c. undesirably slow adsorption kinetics.

Furthermore, when the adsorbed organic vapor is a polymerizable species, carbon can experience a loss of capacity that does not reach a steady state, but continues until the capacity is exhausted. Thus, carbon is completely unsuited for treating streams containing polymerizable organics.

Other methods known to the art are even less satisfactory than activated carbon, with respect to completeness of removal of organic vapors and/or expense. These include such as: a) incineration, as in a flare, b) condensation, and c) scrubbing with a solvent.

These methods are particularly ineffective and expensive when the concentration of organic compounds being removed is very low.

In sum, the currently available methods leave much room for improvement in an era of greater demand for air pollution abatement caused by industrial sources.

It is, therefore, an object of the present invention to provide a more economical and technically efficient process for the prevention of emission of gaseous and vaporized organics from industrial sources.

It is another object to provide an adsorption system for vaporous organic compounds which system can be efficiently and economically regenerated with either steam air or inert gases for multiple cycles of use.

It is a further object to provide a more compact adsorbent system than possible with an activated carbon, without any appreciable decrease in capacity, thereby permitting design of a more economical system.

A still further object is to provide a system which adsorbs organic compounds more efficiently.

It is another object to provide an adsorption system which is adapted to economical and efficient thermal regeneration, (as with steam), from which the desorbed organic vapors from the regeneration phase may be readily recovered or safely disposed of.

Examples of industrial uses which can be enhanced from an ecological viewpoint by the present invention are: application of paints, lacquers and polymeric films, storage tanks, polymerization and other chemical reactions, drycleaning operations, and petroleum refining operations.

The present invention should be additionally useful for adsorbing the following classes of organic compounds from the vapor phase: aliphatic hydrocarbons, aldehydes, and alcohols all of from one to twenty carbon atoms; amines, mercaptans, halides, carboxylic acids, nitrates, aliphatic ketones, ethers, esters, thioethers, and amides all of from two to twenty carbon atoms; olefinic hydrocarbons, aldehydes, alcohols, amines, mercaptans, halides, carboxylic acids, nitrates all of from two to twenty carbon atoms; olefinic ketones, ethers, esters, thioethers, and amides all of from three to twenty carbon atoms; aromatic hydrocarbons, aldehydes, alcohols, amines, mercaptans, halides, carboxylic acids, and nitrates all from six to twenty carbon atoms; and aromatic ketones, ethers, esters, thioethers and amides all of from seven to twenty carbon atoms.

The polymeric adsorbents of this invention can be expected to give substantially complete removal and high capacity for a wide variety of organic compounds being generally superior or comparable to activated carbon in this respect. Unlike carbon, however, regeneration of the polymeric adsorbents with steam appears to be consistently efficient and complete, thereby permitting a high steady state capacity. This allows a much more economical design through the use of smaller adsorbent inventories and equipment.

It is particularly true in those cases where polymerizable monomer vapors are adsorbed. The active surface of carbon appears to stimulate polymerization of such adsorbed vapors, causing a very rapid drop in capacity. With the use of the non-functional polymeric adsorbents of this invention, such does not appear to occur as readily.

Efficient thermal regeneration is a most valuable feature of the process, since it is: a) very inexpensive; b) readily integrated into most existing operations; and c) permits recovery of the desorbed vapors as liquids, which can either be recycled or disposed of by controlled burning; and d) permits the use of smaller adsorbent inventories, and hence smaller scale equipment.

The above-described process should be of great utility as an air pollution abatement system in industry, and is superior to the present day activated carbon systems, as well as other prior art.

The presently preferred materials of choice for this application are high-surface area, acrylic, polymeric adsorbents. They appear to offer the greatest range of applicability combining high capacity with superior regeneration properties, and rapid kinetics are therefore preferred over the non-polar aromatic adsorbents. However, high surface area, non-polar adsorbents still possess advantages over activated carbon. Indeed, they might be preferred over the acrylic adsorbents for certain applications.

EXPERIMENTAL PROCEDURE

An apparatus was specially constructed to evaluate adsorbents under conditions representative of actual use. For this application, a stream of carrier gas (nitrogen) was passed at a rate ranging from 2 to 100 bed volumes/minute through a volume of liquid organic compounds maintained at a preset temperature. There was produced a vapor-laden gas stream which was used either as is, or was further diluted with nitrogen gas.

This stream then was passed through a weighed column containing 20 ml. of the candidate adsorbent, also maintained at a preset temperature. The column effluent was continuously sampled by means of a flame ionization detector, and the response was printed continuously on a strip chart recorder.

The loading cycle was stopped when the increasing leakage of organic vapors from the column produced a predetermined deflection of the recorder. The adsorbent tube was then weighed to determine the amount of adsorbed organics. The resin was then regenerated, as for example, with low pressure steam, and then dried by the sufficient passage of warm air. Prior to the start of the next cycle, the adsorbent tube was again weighed.

EXAMPLE I

In Table I are presented the first cycle weight capacities of a number of adsorbents for adsorbing ethyl acrylate (EA) as a representative organic air pollutant. EA is a readily polymerizable, extremely odiferous organic compound. The human nose can detect it at levels much less than 1 ppb. Thus, EA is a readily noticed air pollutant.

TABLE I

First Cycle Capacities of Adsorbents For Ethyl Acrylate Monomer

Conditions: Saturated ethyl acrylate in nitrogen:
10 Bed Volume/hour

| Adsorbent | Ethyl Acrylate Capacity (lb/ft$^3$) |
|---|---|
| Activated Carbon | 8.26 |
| Resin A | 7.28 |
| Resin B | 2.39 |
| Resin C | 3.56 |
| Resin D | 2.60 |
| Resin E | 3.15 |

Activated carbon is seen to have the highest capacity, followed closely by Resin A.

EXAMPLE II

Next, the samples of activated carbon and Resin A used in the first example, were subjected to repeated loadings and steam regenerations in order to project the long-term capacities of the adsorbents for ethyl acrylate. The results are presented in Table II.

TABLE II

Multiple Cycling of Resin A and Activated Carbon with Ethyl Acrylic

| Cycle No. | Capacity (lb. EA/ft.$^3$) | |
|---|---|---|
| | Resin A | Carbon* |
| 1 | 7.28 | 8.26 |
| 2 | 5.22 | 7.26 |
| 3 | 5.40 | 5.62 |
| 4 | 5.15 | 5.15 |
| 7 | 5.28 | 3.88 |
| Chloroform Regeneration Employed Instead of Steam | | |
| 8 | 7.12 (98.0% recovery) | 7.61 (92.5% recovery) |

Note that activated carbon loses its initially high capacity. By the seventh loading-regeneration cycle, carbon is considerably poorer than the MR resin. This continual loss of capacity could be caused by polymerization of the ethyl acrylate on the surface of the carbon. Such a polymer could not, of course, be removed by treatment with steam. Resin A suffers an initial drop in capacity, after which point no further losses are seen. Significantly, the manufacturers of activated carbon systems recommend that their systems not be used to treat vapor streams containing even moderate concentrations of polymerizable organics.

After the seventh cycle, both adsorbents were treated with chloroform - an excellent solvent for ethyl acrylate monomer and polymer. As a result of this solvent regeneration, the capacity of both adsorbents was largely restored, with nearly quantitative restoration for Resin A.

Thus, it is envisioned that an occasional solvent treatment would be beneficial to the process for certain polymerizable organic compounds. As the expense of solvent regeneration is sufficiently higher than thermal regeneration, it can be economically practiced only if it is performed infrequently, as in the presently taught system. Thus, despite the possibility of needing solvent regeneration, the excellent steam regeneration of exemplary Resin A is still a great advantage over activated carbon, since solvent regeneration would be required much less frequently, if at all.

EXAMPLE III

An additional advantage of such polymeric adsorbent resins are their retention of rapid kinetics after multiple cycling. This is evidenced by the odor leakage threshold of the adsorbents. It is known that ethyl acrylate is one of the most odiferous of all known organic compounds with a reported odor threshold of 0.05 parts per billion. Thus, the absence of odor from test column effluents is indicative of extremely efficient removal. The first detection of odor is a measure of the rapidity of the kinetics of adsorption. The length of running time to odor breakthrough is compared for Resin A and carbon (for the first and seventh cycles) in Table III.

TABLE III

Odor Thresholds of Resin A and Activated Carbon

| | Time to Odor Threshold | |
|---|---|---|
| | Resin A | Activated Carbon |
| First Cycle | 15 min. | 20 min. |
| Seventh Cycle | 13 min. | 10 min. |
| Percent Decrease | 13% | 50% |

These data show that Resin A develops a kinetic advantage over activated carbon with multiple cycling. This is quite significant, since with highly odiferous compounds (such as ethyl acrylate, mercaptans, etc.) the cycling will likely be terminated at the first detection of odor. Thus, the resins of the invention can be operated longer than activated carbon before regeneration is required.

EXAMPLE IV

The previously described procedures were repeated substituting toluene for ethyl acrylate. In addition to activated carbon and Resins C, Resin A was also evaluated. In Table IV below, are shown the capacities of the candidate adsorbents for toluene through four loading regeneration cycles.

TABLE IV

Multiple Cycling of Selected Macroreticular Adsorbents and Carbon Toluene

Influent: Circa 100,000 ppm Toluene (by wt.)
Cycle Cut-off Point: About 10,000 ppm Leakage

| Cycle No. | Capacity (lb. toluene/ft.$^3$) | | |
|---|---|---|---|
| | Resin C | Resin A | Carbon |
| 1 | 5.02 | 4.44 | 5.27 |
| 2 | 4.39 | 5.27 | Not measured |
| 3 | 3.85 | 5.19 | 4.50 |
| 4 | 3.91 | 5.10 | 4.41 |

EXAMPLE V

Dissimilar to ethyl acrylate, the capacity of activated carbon does not continue to decrease but appears to reach a plateau. Surprisingly, Resin A demonstrated an initial capacity increase which it retained.

The time delay till odor threshold of the three adsorbents are compared in Table V. As in Example III, odor threshold is an indication of the rapidity of the kinetics of the system.

TABLE V

Odor Threshold of Selected MR Adsorbents for Toluene

| Time to Odor Threshold | Adsorbent | | |
|---|---|---|---|
| | Resin A | Resin C | Carbon |
| First Cycle | 16 minutes | 26 minutes | 48 min. |
| Fourth Cycle | 28 minutes | 27 minutes | 16 min. |
| Percent Charge | +75% | + 4% | −66% |

The large time decrease in the odor threshold of activated carbon, by the fourth cycle, coupled with the increase in the threshold of Resin A gives a considerable advantage to the polymeric adsorbents.

EXAMPLE VI

In another experiment, the three adsorbent samples used in the previous multiple cycling experiment were evaluated for adsorbing a mixture of ethyl acrylate and toluene. The capacities are presented in Table VI.

TABLE VI

Capacity of Selected MR Adsorbents for Ethyl Acrylate and Toluene

Composition of Vapor = Ethyl Acrylate + Toluene; estimated ratio 1.8:1

| Adsorbent | Total Capacity (lb./ft.$^3$) |
|---|---|
| Resin A | 4.53 |
| Resin C | 4.18 |
| Activated Carbon | 2.98 |

Both resins again show a capacity advantage over activated carbon.

EXAMPLE VII

Treatment of a Dilute Ethyl Acrylate (EA) Stream at High Flow Rate

An experiment was designed to evaluate the process under conditions involving high flow rates and dilute vapor concentrations. The intention is to simulate the extremes of possible field conditions and demonstrate ultimate feasibility. A saturated stream of ethyl acrylate in nitrogen was diluted 100 fold with nitrogen. This stream was then passed through aforedescribed Resin C at a rate of 100 bed volumes per minute. The results are presented in Table VII.

TABLE VII

Influent: EA in Nitrogen, ca. 2000 ppm(wt.)
Flow Rate: 100 Bed Volumes/minute

Ethyl Acrylate Treatment With Resin C

| Bed Volumes Treated | Odor | Leakage (ppm) |
|---|---|---|
| 0 | None | 0.0 |
| 3500 | None | 0.0 |
| 4000 | Faint-Trace | 0.0 |
| 4500 | Trace | 0.5 |
| 5000 | Light | 1.5 |
| 5500 | Moderate | 4.0 |
| 6000 | Strong | 10.0 |

These data show that the kinetics of Resin C are extremely favorable and permit complete removal of the ethyl acrylate from a very large volume of gas.

EXAMPLE VIII

Treatment of Vaporized Dry Cleaning Solvent

The emission of solvent vapors from dry cleaning operations is a recognized pollution problem. An experiment was performed to show that Resin C should be very effective in abating this source of pollution. The previous experiment was repeated using perchloroethylene, a widely used dry cleaning solvent, as the organic liquid. The results are presented in Table VIII.

TABLE VIII

Adsorption of Perchloroethylene (PCE) Vapors on Resin C

Influent: 1.75 mg. PCE/liter of nitrogen = 1500 ppm (wt.)
Flow Rate = 100 Bed Volumes/minute

| Bed Volumes Treated | Leakage | Capacity (lb. PCE per ft.$^3$Resin C |
|---|---|---|
| 0 | 0.0 | 0 |
| 10,000 | 0.0 | 1.10 |
| 20,000 | 0.0 | 2.20 |
| 21,000 | 0.0 | 2.32 |
| 23,000 | 30 | Not Measured |
| 25,000 | 390 | Do. |
| 30,000 | 660 | Do. |
| 35,000 | 1150 | Do. |
| 37,500 | 1320 | 3.24 |

Resin C is shown to be able to treat an extremely large volume of gas with no leakage of organic vapors. High capacity is attained despite the low concentration in the influent.

EXAMPLE IX

Treatment of Vapors Arising from an Actual Chemical Synthesis Operation

During the manufacture of a synthetic fungicide, a petroleum distillate having a boiling range of 90°-110°C. is employed. A highly concentrated organic vapor is emitted during vacuum filtration of the product of the reaction. The vapor contains large amounts of organic solvents, such as toluene, methanol and octane, and trace amounts of highly odiferous sulfur compounds. Resin C was shown to be highly effective for treating such a stream.

The concentrated mother liquid from the manufacturer's process was placed in the evaluation apparatus. Nitrogen was bubbled through Resin C at a rate of 2 bed volumes per minute. The resin was loaded to high leakage and then regenerated with steam and dried. A second cycle was then run. The results are presented in Table IX.

TABLE IX

Treatment of Organic
Vapor from a Synthesis
Process with Resin C —
Second Cycle

Flow Rate: 2 Bed
Volumes per Minute
Influent Concentration:
8.85 g. per ft.$^3$ of
nitrogen = 305,000
ppm(wt.)

| Treated Bed Volumes | Running Time (hr.) | Chart Response | % Leakage* | Odor | Capacity (ft.$^3$Resin C) |
|---|---|---|---|---|---|
| 0 | 0 | 0 | 0 | None | 0 |
| 600 | 5 | 0 | 0 | None | 12.8 |
| 800 | 6.7 | 300 | 1% | Very faint | Not measured |
| 1000 | 8.4 | 1000 | 3% | slight aromatic | Do. |
| 1200 | 10 | 2700 | 9% | moderate aromatic | 16.3 |

*Estimated

Resin C is seen to remove all the odiferous sulfur compounds and most of the solvents to very high loading. The high efficiency of exemplary Resin C should permit very economical treatment of this pollution problem.

In the foregoing table, the chemical identity of the evaluated resins follows in Table X.

TABLE X

| Resin A | A homopolymer of trimethylolpropane trimethacrylate (TMPTMA) |
| Resin B | A macroreticular, strongly acidic cation exchange resin prepared by the sulfonation of a Resin C. |
| Resin C | A copolymer of 85% divinylbenzene and 15% ethylvinylbenzene (U.S. Patent 3,531,463). |
| Resin D | A copolymer of trimethylolpropane trimethacrylate and methylmethacrylate |
| Resin E | Phenyl Sulfoxide Derivative of a copolymer of 50% divinylbenzene (DVB) plus 50% styrene ethylvinylbenzene (U.S. Patent 3,531,463). |

EXAMPLE VII

Synthesis of Trimethylolpropane Trimethacrylate Homopolymer (Resin A)

Resin A is prepared as follows:

6000 grams of water, 180 grams (3.0 percent of water) of sodium chloride, 6 grams (0.2 percent of organic phase) of gelatin, and 72 grams of a 12.5 wt. percent aqueous solution polyacrylate (0.3 wt. percent of organic phase is sodium polyacrylate) are mixed in a twelve liter flask until a homogeneous solution resulted. After the pH of the aqueous solution is adjusted to 8 to 9 with concentrated aqueous ammonia a mixture of 900 grams (2.66 moles) of commercial trimethylolpropane trimethacrylate with 9 grams (1.0 wt. of monomer) of lauroyl peroxide, and 2100 grams (22.79 moles, 70 wt. percent of the organic phase) of toluene is introduced into the reactor. (The commercial trimethylolpropane trimethacrylate analyzed by gas-liquid chromatography to be 92 percent triester and 8 percent diester, i.e., trimethylolpropane dimethacrylate). The dispersion of organic liquid in an aqueous phase is prepared at ambient temperature at 80 rpm with on-off agitation cycles until only droplet and aqueous phases remains in the absence of stirring. Formation of the dispersion requires approximately fifteen minutes. The droplets are polymerized under nitrogen at 65°C. for 20 hrs. into solid, opaque spheres, washed, and dried. The yield of dried copolymer is 986 grams or 99.5 percent of theory. The physical characteristics of the porous beads are stated in Table XI. below:

TABLE XI

| appearance | opaque white |
|---|---|
| apparent density g.ml.$^{-1}$ | 0.564 |
| skeletal density, g.ml.$^{-1}$ | 1.245 |
| Porosity, Fol.% | 55 |
| surface area, m$^2$g.$^{-1}$ | 450 |
| average pore diameter, A. | 90 |
| Percentage decolorization | 75 |

EXAMPLE XI

Synthesis of Copolymer of Trimethylolpropane Trimethacrylate and Methyl Methacrylate (Resin D)

Into a 500 ml. flask are placed 208.6 grams of aqueous liquid and 101.0 grams of immiscible organic liquid containing the monomers, of that the weight ratio of aqueous to organic phases is approximately two to one. The composition of the aqueous phase is 400 grams of water, 12 grams of sodium chloride (3.0 wt. percent of water), 0.8 grams of gelatin (0.2 wt. percent of organic phase), and 9.6 grams of 12.5 wt. percent sodium polyacrylate in water (0.3 wt. percent of organic phase is sodium polyacrylate).

The composition of the organic layer is 50 grams (0.148 mole) methyl methacrylate inhibited with 200 ppm monomethyl ether of hydroquinone, 50 grams (0.07388 mole) commercial trimethylolpropane trimethacrylate (TMPTMA) which contains 93 wt. percent trimethylolpropane trimethacrylate and 7 wt. percent dimethacrylate ester, 100 grams (0.979 mole, 50 Wt. percent of organic phase) of methyl isobutylcarbinol (MIBC), and 1.0 grams (1.0 percent of monomer weight) lauroyl peroxide.

In this procedure, the molar ratio of methyl methacrylate to the trifunctional crosslinker is 3.93 and the molar ratio of monomer solvent (MIBC) to copolymer is 1.3435.

After introduction of the aqueous solution, sufficient concentrated aqueous ammonium hydroxide (several drops) is added to raise the pH to within the range of 8 to 9. After flushing the system with nitrogen, the immiscible mixture is stirred at ambient temperature (about 25°C.) at 150 rpm, with as many on-off stirring cycles as necessary to disperse completely all the organic liquid into small droplets (0.2 to 0.5 mm diameters) in the aqueous layer. When the system, in the absence of agitation, no longer formed a separate organic layer distinct from the droplet and water layers, the dispersion is heated in an atmosphere of nitrogen at 65°C. for twenty hours with the same agitation used to develop the droplets in order to polymerize the liquid monomer into solid spheres. The product, a copolymer of 44.8 percent TMPTMA, 5.2 percent Trimethylolpropane dimethacrylate (TMPDMA), and 50 percent methyl methacrylate, is cooled to ambient temperature, washed and dried. The yield of dried product is 99 grams of 98 percent of theory. The copolymer's physical properties are tabulated below in Table XII.

TABLE XII

Resin A of the Decolorization Performance Data

| Appearance | opaque white |
|---|---|
| Apparent density, g.ml.$^{-1}$ | 0.605 |
| Skeletal density, g.m.$^{-1}$ | 1.243 |
| Porosity, ml. pores (ml. beads)$^{-1}$ | 0.513 |
| Internal surface area, m.$^2$g.$^{-1}$ | 160 |
| Average pore diameter, A. | 212 |

EXAMPLE XII

Synthesis of a Porous Copolymer Containing Diaryl Sulfoxide Functionalities (Resin E)

To a blackened 1-liter flask, equipped with a stirrer, condenser, gas inlet tube, and a thermometer are added 63.0 grams of dried (DVB-EVB copolymer) and 200 grams of ethylene dichloride. A sweep of dry nitrogen is started and the beads are allowed to swell for 30 minutes at room temperature with agitation.

In a separate flask, 65.0 grams of thionyl chloride is dissolved in 100 grams of ethylene dichloride and 53.4 grams of solid, anhydrous aluminum chloride are added to the stirring solution while maintaining the temperature under 35°C. After all the aluminum chloride has dissolved, the mixture is added to the pre-swollen beads at a rate such that the temperature remains below 35°C.* (*During this step and subsequent steps until the reaction is quenched, hydrogen chloride gas is liberated. Precautions are taken so that the batch will not purge as a result of rapid gas evolution. The times and conditions given here should prevent such rapid liberation of hydrogen chloride.)

The flask is stirred at room temperature (<35°C.) for two hours and then is slowly heated over a period of about one hour to reflux temperature (80°–85°C.) Reflux is maintained for an additional two hours, and then the reaction is cooled to about 10°C. in an ice bath. There then is added 100.0 grams of benzene, at a rate such that the temperature does not exceed 30°C. After all the benzene has been added, the reaction mixture is stirred at room temperature (<35°C.) for one hour. Heat is then slowly applied to attain reflux and the reaction is maintained at reflux temperature for two hours. The mixture is cooled to 15°C. and then quenched by pouring same into 500 ml. of an ice-cold, 10 percent hydrochloric acid— water mixture at a rate such that the temperature does not exceed 50°C.

The quench solution solution is stirred for two hours to decompose aluminum salts after which the beads are filtered and washed twice with water. The beads are retransferred as a slurry to the reaction flask and an azeotrope distillation procedure is performed to remove imbibed organic solvents. The excess water is siphoned from the flask and the beads are washed with additional water until the wash water is neutral to pH paper. Excess water is siphoned from the flask and the beads are packed out wet. A 20 to 30 mesh cut is dried and measured for physical properties set forth in Table XIII below:

TABLE XIII

Physical Properties of Resin E

| Appearance: | Opaque brown beads |
|---|---|
| Elemental Analysis: | 8.28% S |
| | 5.26% O |
| | 1.61% Cl |
| | 75.29% C |
| | 7.24% H |
| Apparent Density: | 0.731 grams/cm$^3$ |
| Skeletal Density: | 1.218 grams/cm$^3$ |
| Porosity: | 39.9 volume percent |
| Surface Area: | 31.9 meters$^2$/gram |
| Average Pore Diameter: | 68 Angstroms |

According to the present invention, the resins which may be usefully employed for the sorption and recovery of the gaseous or vaporized organic compounds in the manner described herein, are defined as particulated, macroreticular, water-insoluble polymer of:

1. polymerizable ethylenically unsaturated monomers comprising about 2 to 100 weight percent of at least one poly (vinylbenzene) monomer selected from the group consisting of divinylbenzene, trivinylbenzene, alkyldivinylbenzene having from 1 to 3 alkyl groups of 1 to 2 carbon atoms substituted in the benzene nucleus or,
2. 10 to 100 percent by weight of a polyfunctional methacrylate containing at least three methacrylate groups, wherein the polymer contains 90 percent to 0 percent by weight of a comonomer and which may be monoethylenically unsaturated, or which may be a diethylenically unsaturated comonomer or
3. derivatives of the above polymers containing one of sulfonic acid, quaternary ammonium, amine, amine oxide, sulfoxide, amide, or ketone functionality; which polymer has a surface area of at least 10 to 1000 square meters per gram, having a porosity of at least 25 percent ranging up to 85 percent, and having pores of an average diameter of at least 20 A ranging up to 20,000 A;

In a preferred embodiment, the macroreticular resin is in the form of small spheroidal beads of predominantly 4 to 100 mesh size, the resin having a porosity of 30 percent ranging up to 70 percent, a specific surface area of 100 ranging to 900 square meters per gram; and an average pore diameter of 20 A to 200 A. As to the regenerant fluids which may be used in the present invention, some are the following: steam, water, an aqueous solution of an acid, an aqueous solution of a base, an aqueous solution of a salt or a liquid organic solvent. Further, an inert gaseous fluid may be employed such as nitrogen, argon, helium, carbon dioxide or freon.

I claim:

1. A method of air pollution abatement substantially precluding dissipation into the ambient air of the vaporized organic compounds emitted by industrial plants, which comprises
    a. diverting industrial organic vapors from such plants into a mass or bed of a macroreticular water-insoluble cross-linked polymer composed of 10–100 percent by weight of a polyvinyl methacrylate containing at least three methacrylate groups, wherein the balance of the polymer to make a 100 weight percent is a monoethylenically or diethylenically unsaturated comonomer or derivatives of said polymer containing a group selected from the class consisting of sulfonic acid, amine oxide, quaternary ammonium amine, sulfoxide, amide, and ketone functionality; which polymer has a surface area of at least 10 –1,000 square meters per gram, a porosity of at least 25 percent ranging up to 85 percent and pores of an average diameter of at least 20 A ranging up to 20,000 A units;
    b. contacting the loaded polymer with a regenerant fluid to release substantially all of the adsorbed organics; and
    c. directing the desorbed organics to a disposal other than by atmospheric discharge.

2. A method according to claim 1 wherein the industrial plant is selected from the group consisting of spray painting, lacquering, dry cleaning, adhesive bonding, petroleum refining and chemical synthesis.

3. A method according to claim 1 wherein the macroreticular resin is in the form of small spheroidal beads of predominantly 4 to 100 mesh size, the resin having a porosity of 30 percent ranging up to 70 percent, a specific surface area of 100 ranging to 900 square meters per gram; and an average pore diameter of 20 A to 200 A.

4. The method according to claim 1 wherein the desorbed organic compounds are condensed from the regenerant fluid and recovered.

5. The method of claim 1 wherein the polymer comprises 100 percent of a polyfunctional methacrylate containing at least three methacrylate groups.

6. The method according to claim 1 wherein said regenerant fluid is steam.

7. A method according to claim 1 wherein the regenerant fluid is water or an aqueous solution of an acid, a base or a salt.

8. The method according to claim 1 wherein said regenerant fluid is air.

9. The method of claim 6 wherein the polymer bed is dried following regeneration by the passage therethrough of a low moisture gaseous fluid.

10. The method according to claim 1 wherein said regenerant fluid is an inert gas such as nitrogen, argon, helium, carbon dioxide or freon.

11. A method according to claim 1 wherein the organic vapor comprises perchloroethylene.

12. A method according to claim 1 wherein the organic vapor comprises aromatic solvents.

13. A method according to claim 1 wherein the organic vapor contains hydrocarbon fuel vapors.

14. A method according to claim 1 wherein the organic vapor comprises monomers such as acrylates, urethanes or styrene.

15. A method according to claim 1 wherein the organic vapor contains components derived from petroleum distillates having a boiling range of 90°–110°C., and the source of emission is organic synthesis reactions.

16. A method according to claim 1 wherein the regenerant fluid is a liquid organic solvent.

17. A method according to claim 1 whereby it is employed as a means to isolate and recover an organic substance present in the vapor phase.

18. The method according to claim 1 wherein the polymer is a copolymer of from 30 to 70 percent of methyl methacrylate and from 70 to 30 percent of trimethylolpropane trimethacrylate.

19. The method according to claim 1 wherein the polyfunctional methacrylate is one of trimethylolpropane trimethacrylate or pentaerythritol tetramethacrylate.

20. The method according to claim 5 wherein the polyfunctional methacrylate is trimethylolpropane trimethacrylate.

* * * * *

UNITED STATES PATENT OFFICE
CERTIFICATE OF CORRECTION

Patent No. 3,798,876      Dated March 26, 1974

Inventor(s) David C. Kennedy

It is certified that error appears in the above-identified patent and that said Letters Patent are hereby corrected as shown below:

Column 3, line 41, "acrylic" should read -- acrylate --. Column 7, line 3, "liquid" should read -- liquor --; line 56, "Example VII" should read -- Example X --. Column 8, 4th line of Table XI, "Fol." should read -- Vol. --.

Signed and sealed this 24th day of September 1974.

(SEAL)
Attest:

McCOY M. GIBSON JR.
Attesting Officer

C. MARSHALL DANN
Commissioner of Patents